United States Patent
Rakshit et al.

(10) Patent No.: US 12,387,434 B2
(45) Date of Patent: Aug. 12, 2025

(54) VIRTUAL OBJECT DISPLAY ON INTERSECTION OF FIELD OF VIEW

(71) Applicant: INTERNATIONAL BUSINESS MACHINES CORPORATION, Armonk, NY (US)

(72) Inventors: Sarbajit K. Rakshit, Kolkata (IN); Jagadesh Ramaswamy Hulugundi, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 206 days.

(21) Appl. No.: 18/150,851

(22) Filed: Jan. 6, 2023

(65) Prior Publication Data

US 2024/0233273 A1  Jul. 11, 2024

(51) Int. Cl.
*G06T 15/00* (2011.01)
*G06F 3/01* (2006.01)
*G06T 19/00* (2011.01)

(52) U.S. Cl.
CPC ............. *G06T 19/00* (2013.01); *G06F 3/011* (2013.01); *G06T 2210/21* (2013.01); *G06T 2219/024* (2013.01)

(58) Field of Classification Search
CPC .... H04N 23/611; H04N 23/635; H04N 23/64; H04N 23/90; G06T 7/337; G06T 7/50;
(Continued)

(56) References Cited

U.S. PATENT DOCUMENTS 9,122,321 B2  9/2015 Perez
9,767,616 B2  9/2017 Miller
(Continued)

FOREIGN PATENT DOCUMENTS

EP  3914996 A1  12/2021

OTHER PUBLICATIONS

"Field of View" (Apogee Instrument, [online], Retrieved on Jan. 27, 2025, URL: https://web.archive.org/web/20170503211557/https://www.apogeeinstruments.com/field-of-view/) (Year: 2017).*
(Continued)

*Primary Examiner* — Gordon G Liu
(74) *Attorney, Agent, or Firm* — Robert R. Aragona

(57) ABSTRACT

An embodiment for displaying a virtual object on an intersection of a field of view (FOV) of multiple users is provided. The embodiment may include receiving data relating to an orientation of a plurality of extended reality (XR) devices. The embodiment may also include deriving a plurality of FOV cones of a primary user and at least one secondary user. The embodiment may further include identifying an intersection boundary where the plurality of FOV cones at least partially overlap. The embodiment may also include identifying a portion within the intersection boundary where 3D dimensions of one or more virtual objects are able to be maximized. The embodiment may further include predicting the maximized 3D dimensions of the one or more virtual objects. The embodiment may also include displaying, within the identified portion, the one or more virtual objects to the primary user and the at least one secondary user.

20 Claims, 3 Drawing Sheets

(58) Field of Classification Search
CPC ....... G06T 7/74; G06T 19/20; G06T 2200/04;
G06T 2207/10016; G06T 2207/30244;
G06T 2219/024; G06T 2219/2016; G06T
2210/12; G06T 2210/21; G06T 7/70;
G06T 2207/20084; G06T 19/00; G06T
17/20; G06T 17/00; G06T 15/10; G06T
15/00; G06T 13/40; G06T 15/06; G06T
15/08; G06T 15/20; G06T 15/04; G06T
2210/41; G06T 15/005; G06T 1/20; G06T
19/006; G06V 20/20; G06F 16/51; G06F
21/602
USPC ......................................................... 345/419
See application file for complete search history.

(56) References Cited

U.S. PATENT DOCUMENTS

| | | | |
|---|---|---|---|
| 10,571,263 B2 | 2/2020 | Abovitz | |
| 10,657,716 B2 | 5/2020 | Clausen | |
| 10,678,492 B1* | 6/2020 | Rakshit | G02C 11/10 |
| 2013/0326364 A1* | 12/2013 | Latta | G06F 3/012 |
| | | | 715/751 |
| 2014/0368537 A1 | 12/2014 | Salter | |
| 2019/0340821 A1* | 11/2019 | Chen | G06F 3/04815 |
| 2024/0005618 A1* | 1/2024 | Hitchcock | G06T 19/20 |
| 2024/0164730 A1* | 5/2024 | McCarthy | A61B 6/037 |

OTHER PUBLICATIONS

Dong, et al., "Collaborative visualization of engineering processes using tabletop augmented reality", ELSEVIER, Advances in Engineering Software, vol. 55, Jan. 2013, pp. 45-55. <http://dx.doi.org/10.1016/j.advengsoft.2012.09.001>.

Kasapakis, et al., Occlusion handling in outdoors augmented reality games, Multimedia Tools and Applications, Apr. 2017, 27 Pages. <https://www.researchgate.net/figure/FoV-determination-utilizing-the-ray-intersection-approach_fig5_303017536>.

Kiyokawa, "3D Collaboration using Mixed Reality Technology", ResearchGate, Jan. 28, 2015, 7 pages. <https://www.researchgate.net/publication/266444036>.

Muller, et al., "Studying Collaborative Object Positioning in Distributed Augmented Realities", ACM, MUM '17, Stuttgart, Germany, Nov. 26-29, 2017, pp. 123-132. <https://dl.acm.org/doi/10.1145/3152832.3152856>.

Schechter, "The Ultimate Guide to Markerless Augmented Reality", 3D Cloud Marxent, May 9, 2014, 20 Pages. <https://www.marxentlabs.com/what-is-markerless-augmented-reality-dead-reckoning/>.

\* cited by examiner

VIRTUAL OBJECT DISPLAY ON INTERSECTION OF FIELD OF VIEW

BACKGROUND

The present invention relates generally to the field of computing, and more particularly to a system for displaying a virtual object on an intersection of a field of view (FOV) of multiple users.

In any physical workspace, multiple users may be collaborating on an activity in an office or conference room. Similarly, a number of users may join the collaboration via a virtual platform. During the workplace collaboration, the users may be required to interact with a virtual object. For example, the users may be planning the design of a building and may be required to engage with a virtual layout of a floorplan of the building. When these multiple users collaborate, the virtual object may be displayed in such a manner that one or more of the users may not be able to properly engage with the virtual object. Information relevant to attempts to address this problem can be found in U.S. Pat. No. 10,678,492, U.S. Patent Application Publication No. US 2014/0368537, and European Patent Application Publication No. EP 3,914,996. However, each one of these references suffers from one or more of the following disadvantages: a failure to replicate the virtual object upon recognition of one or more factors; and a failure to maximize a size of the virtual object on the intersection of the FOV of multiple users.

SUMMARY

According to one embodiment, a method, computer system, and computer program product for displaying a virtual object on an intersection of a field of view (FOV) of multiple users is provided. The embodiment may include receiving data relating to an orientation of a plurality of extended reality (XR) devices during a collaboration. The embodiment may also include deriving a plurality of FOV cones of a primary user and at least one secondary user based on the orientation of the plurality of XR devices and a relative position of the primary user and the at least one secondary user. The embodiment may further include identifying an intersection boundary where the plurality of FOV cones at least partially overlap. The embodiment may also include identifying a portion within the intersection boundary where 3D dimensions of one or more virtual objects are able to be maximized based on the relative position of the primary user and the at least one secondary user. The embodiment may further include predicting the maximized 3D dimensions of the one or more virtual objects based on a size of the identified portion. The embodiment may also include displaying, within the identified portion, the one or more virtual objects to the primary user and the at least one secondary user. This embodiment has the advantage of dynamically displaying a virtual object in an appropriate position such that each user can properly engage with the virtual object.

According to at least one other embodiment, in response to determining the orientation of the at least one XR device changes, the maximized 3D dimensions of the one or more virtual objects may be automatically adjusted. This embodiment has the advantage of dynamically changing the 3D dimensions of the virtual object.

According to at least one further embodiment, automatically adjusting the maximized 3D dimensions of the one or more virtual objects may further include replicating the one or more virtual objects in response to determining at least one additional intersection boundary is formed. This embodiment has the advantage of replicating the virtual object when the multiple users split into a variety of groups.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
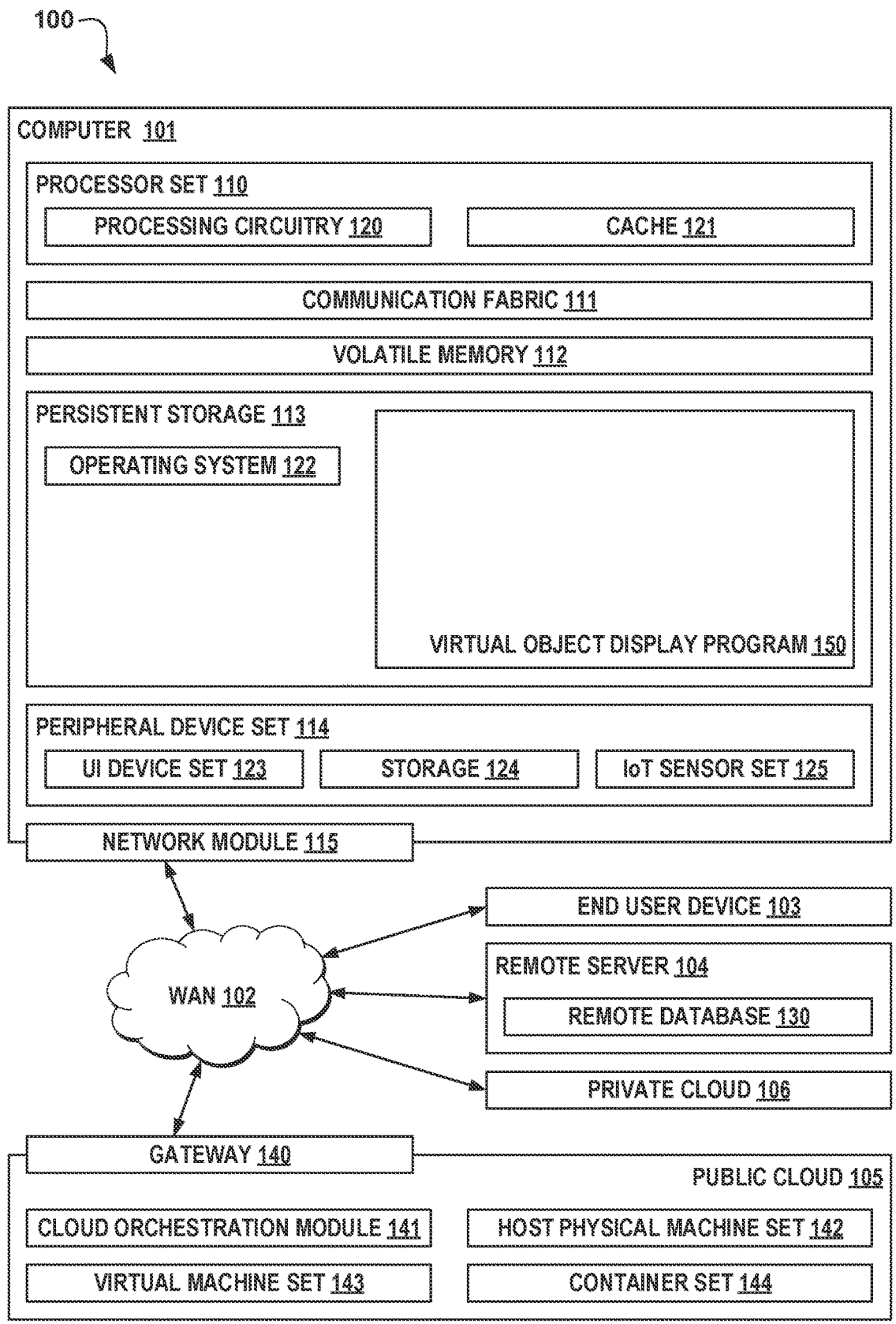
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for displaying a virtual object on an intersection of a field of view (FOV) of multiple users. The following described exemplary embodiments provide a system, method, and program product to, among other things, identify a portion within an intersection boundary where 3D dimensions of one or more contextually derived virtual objects are able to be maximized and, accordingly, display the one or more contextually derived virtual objects within the identified portion to the primary user and the at least one secondary user consistent with the maximized 3D dimensions. Therefore, the present embodiment has the capacity to improve extended reality (XR) technology by dynamically displaying a virtual object in an appropriate position such that each user can properly engage with the virtual object.

As previously described, in any physical workspace, multiple users may be collaborating on an activity in an office or conference room. Similarly, a number of users may join the collaboration via a virtual platform. During the workplace collaboration, the users may be required to interact with a virtual object. For example, the users may be planning the design of a building and may be required to engage with a virtual layout of a floorplan of the building.

When these multiple users collaborate, the virtual object may be displayed in such a manner that one or more of the users may not be able to properly engage with the virtual object. This problem is typically addressed by sharing the virtual object between different users when their FOVs match. However, merely sharing the virtual object fails to replicate the virtual object upon recognition of one or more factors and maximize a size of the virtual object on the intersection of the FOV of multiple users.

It may therefore be imperative to have a system in place to identify the appropriate position of the virtual object when multiple users are participating in the collaboration.

According to at least one embodiment, when multiple users are interacting with XR devices, data relating to an orientation of a plurality of XR devices during a collaboration may be received in order to derive a plurality of FOV cones of a primary user and at least one secondary user based on the orientation of the plurality of XR devices and a relative position of the primary user and the at least one secondary user. Upon deriving the plurality of FOV cones, an intersection boundary where the plurality of FOV cones at least partially overlap may be identified so that a portion within the intersection boundary where 3D dimensions of one or more virtual objects are able to be maximized based on the relative position of the primary user and the at least one secondary user. Then, the maximized 3D dimensions of the one or more virtual objects may be predicted based on a size of the identified portion such that the one or more virtual objects may be displayed, within the identified portion, to the primary user and the at least one secondary user. This embodiment has the advantage of dynamically displaying a virtual object in an appropriate position such that each user can properly engage with the virtual object.

According to at least one other embodiment, in response to determining the orientation of at least one XR device changes, the maximized 3D dimensions of the one or more virtual objects may be automatically adjusted. This embodiment has the advantage of dynamically changing the 3D dimensions of the virtual object.

According to at least one further embodiment, upon automatically adjusting the maximized 3D dimensions of the one or more virtual objects, the one or more virtual objects may be replicated in response to determining at least one additional intersection boundary is formed. This embodiment has the advantage of replicating the virtual object when the multiple users split into a variety of groups.

The present invention does not require that all advantages need to be incorporated into every embodiment of the invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to identify a portion within an intersection boundary where 3D dimensions of one or more contextually derived virtual objects are able to be maximized and, accordingly, display the one or more contextually derived virtual objects within the identified portion to the primary user and the at least one secondary user consistent with the maximized 3D dimensions.

Referring to FIG. 1, an exemplary computing environment 100 is depicted, according to at least one embodiment. Computing environment 100 contains an example of an environment for the execution of at least some of the computer code involved in performing the inventive methods, such as a virtual object display program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include an augmented reality (AR) headset, a virtual reality (VR) headset, a compass, a magnetic chip, and/or any other device for measuring head movements of the user. Peripheral device set 114 may further include a holographic projector device.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the virtual object display program 150 may be a program capable of receiving data relating to an orientation of a plurality of XR devices during a collaboration, identifying a portion within an intersection boundary where 3D dimensions of one or more contextually derived virtual objects are able to be maximized, displaying the one or more contextually derived virtual objects within the identified portion to the primary user and the at least one secondary user consistent with the maximized 3D dimensions, dynamically displaying the virtual object in an appropriate position such that each user can properly engage with the virtual object, dynamically changing the dimensions of the virtual object, and replicating the virtual object when the multiple users split into a variety of groups. Furthermore, notwithstanding depiction in computer 101, the virtual object display program 150 may be stored in and/or executed by, individually or in any combination, end user device 103, remote server 104, public cloud 105, and private cloud 106. The virtual object display method is explained in further detail below with respect to FIG. 2. It may be appreciated that the examples described below are not intended to be limiting, and that in embodiments of the present invention the parameters used in the examples may be different.

Figure 2:
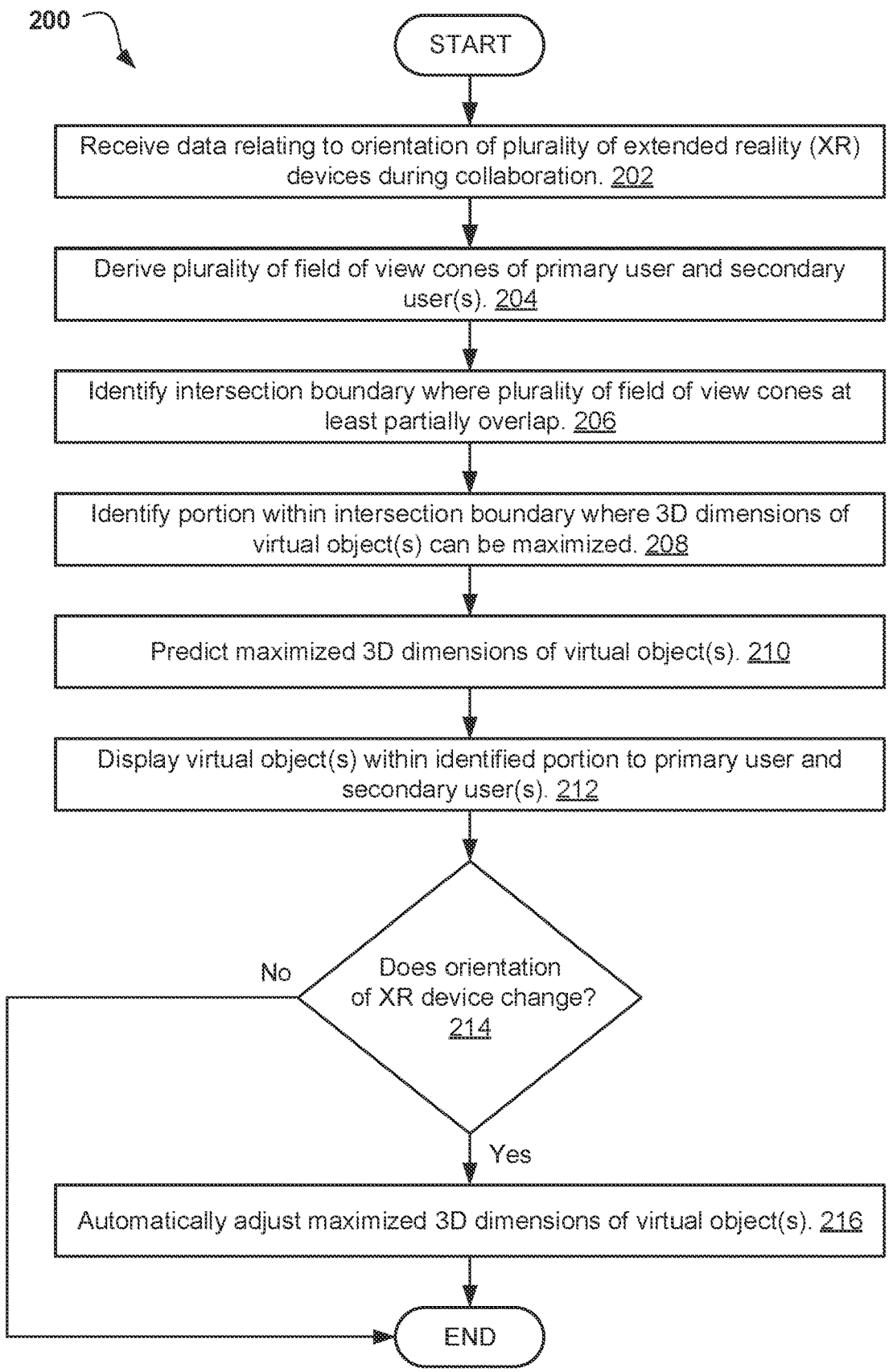
FIG. 2 illustrates an operational flowchart for displaying a virtual object on an intersection of a field of view (FOV) of multiple users in a virtual object display process according to at least one embodiment.

Referring now to FIG. 2, an operational flowchart for displaying a virtual object on an intersection of a FOV of multiple users in a virtual object display process 200 is depicted according to at least one embodiment. At 202, the virtual object display program 150 receives the data relating to the orientation of the plurality of XR devices during the collaboration. The collaboration may be an interaction between multiple users in a physical workspace, such as an office, or an interaction between multiple users where at least one user is remote from the physical workspace.

The data relating to the orientation of the plurality of XR devices may be a 3D position of the XR devices. It may be appreciated that in embodiments of the present invention, each user participating in the collaboration may be wearing the XR device. Examples of the XR device include, but are not limited to, the AR device, the XR device, and the holographic projector. The orientation may be detected by and received from peripheral device set 125, such as the compass and/or magnetic chip embedded in the XR device. The 3D position may be an angular orientation of the XR device from a known location and may be utilized to infer the viewing direction of the multiple users. For example, at least one user may be gazing in a northwest direction. In the context of the collaboration, the multiple users may include one primary user and at least one secondary user, described in further detail below with respect to step 204.

Then, at 204, the virtual object display program 150 derives the plurality of FOV cones of the primary user and the at least one secondary user. The plurality of FOV cones are derived based on the orientation of the plurality of XR devices and the relative position of the primary user and the at least one secondary user. The primary user may be a meeting host and/or an organizer of the collaboration. The primary user may identify themselves as the primary user via a graphical user interface (GUI) on a device of the primary user, such as a smartphone. It may be appreciated that in embodiments of the present invention, any user who is not the primary user may be the secondary user.

Figure 3:
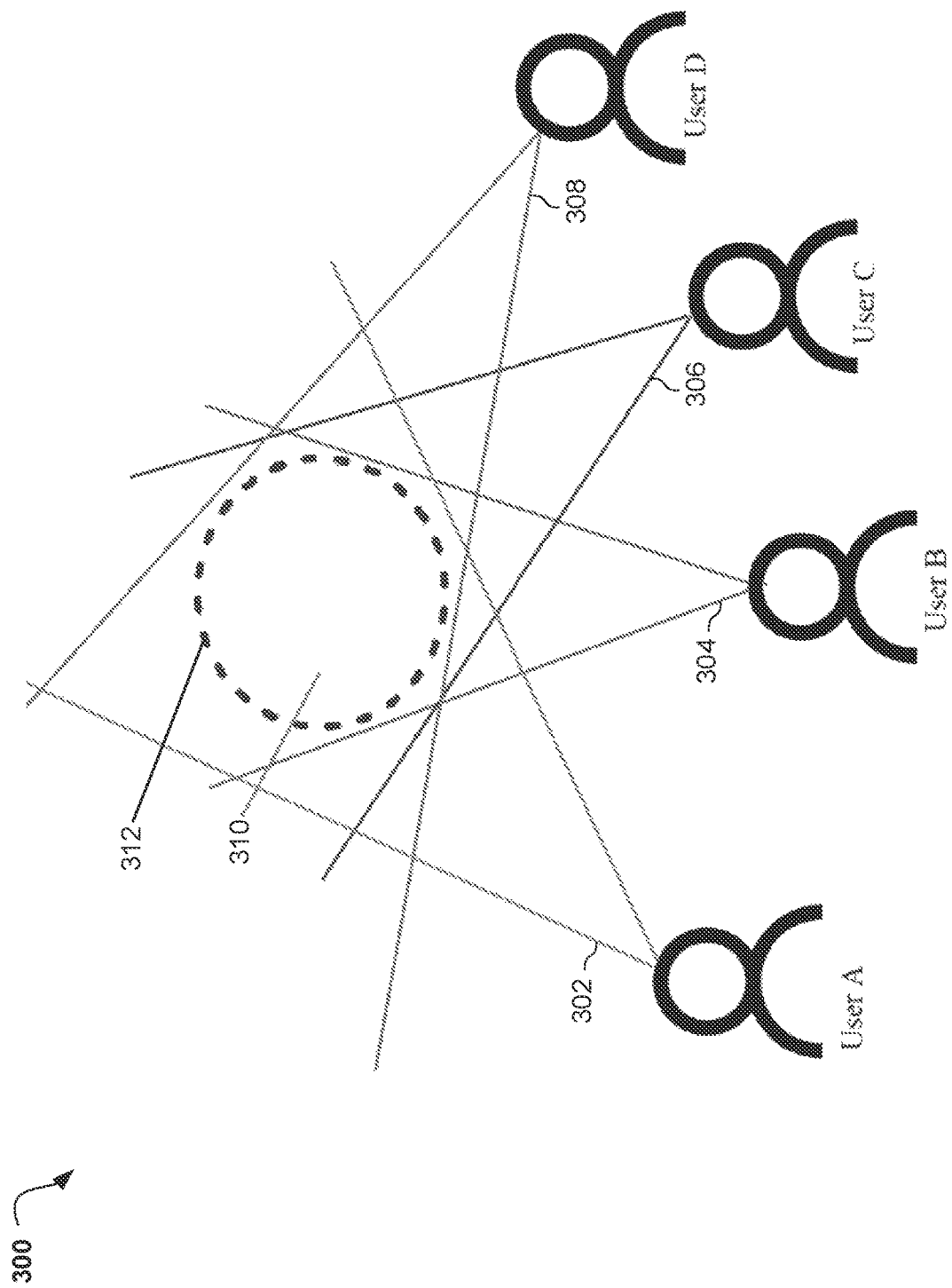
FIG. 3 is a diagram depicting an operational example of the virtual object being displayed on the intersection boundary of the FOV of multiple users according to at least one embodiment.

For each user, one FOV cone may be derived, as illustrated in FIG. 3. It may be appreciated that in embodiments of the present invention, since multiple users are participating the in collaboration, at least two FOVs may be derived for the multiple users. The FOV cone may be defined by the angle through which each user can see the visible world. When the multiple users are wearing the XR devices, the FOV cone may be the area viewed by the multiple users as captured by the lenses of the XR devices. The orientation of the plurality of XR devices may be utilized by the virtual object display program 150 to measure the viewing direction of each user. For example, when an XR device is oriented in a northwest direction, it may be inferred that the user wearing that XR device is facing and viewing the area northwest at their current location. The angle of the FOV cone may gradually expand as the distance from each user increases, as illustrated in FIG. 3. For example, at a point closest to the user, the angle of the FOV cone may be 45°, and at a point farthest from the user, the angle of the FOV cone may be 60°.

The relative position of the primary user and the at least one secondary user may also impact the angle of the FOV cone. For example, when the multiple users are positioned in a semicircle, as illustrated in FIG. 3, each user may have an unobstructed view of the surrounding environment. In another example, when a secondary user is positioned diagonally in front of the primary user, the view of the primary user may be obstructed. In this example, the FOV cone of the primary user may be narrower than the FOV cone of the secondary user positioned diagonally in front of the primary user.

According to at least one embodiment, at least one of the plurality of FOV cones may be derived for a user who is participating in the collaboration virtually. For example, the virtual user may be interacting with the other users via an online collaborative meeting application. The FOV cone of the virtual user may be the area viewed by the virtual user as captured by a camera in the collaboration room. Thus, the direction the camera is facing may be indicative of the resulting area viewed by the virtual user.

Next, at 206, the virtual object display program 150 identifies the intersection boundary of the plurality of FOV cones. The intersection boundary is a location where the plurality of FOV cones at least partially overlap, as illustrated in FIG. 3. The FOV cones at least partially overlap when the multiple users are viewing at least a portion of the same object in the surrounding environment.

For example, in an outdoor collaborative environment, the primary user may be viewing a building in the center of their FOV cone, and the secondary users may be viewing the same building from a different vantage point in the center of their FOV cone. In this example, the plurality of FOV cones may substantially overlap. In another example, the primary user may be viewing the left portion of the building in a right corner of their FOV cone, and the secondary users may be viewing the left portion of the building in a left corner of their FOV cone. In this example, the plurality of FOV cones may at least partially overlap. The intersection boundary of the plurality of FOV cones may thus be defined by an area in the surrounding environment that is visible to each user from their vantage point.

According to at least one embodiment, the primary user may identify the secondary users who are participating in the collaboration. Therefore, at least one secondary user who is wearing the XR device may be excluded from the collaboration. The FOV cone of any secondary user who is excluded from the collaboration may not be derived and thus may not be considered when identifying the intersection boundary.

Then, at 208, the virtual object display program 150 identifies the portion within the intersection boundary where the 3D dimensions of the one or more virtual objects are able to be maximized. The portion within the intersection boundary is identified based on the relative position of the primary user and the at least one secondary user.

According to at least one embodiment, the one or more virtual objects may be selected by the primary user. For example, the primary user may select a virtual animal via the GUI on the smartphone of the primary user. The one or more virtual objects may be selected from a virtual object library in the remote database 130. According to at least one other embodiment, the one or more virtual objects may be independently created by one or more of the multiple users. For example, either the primary user or any secondary user may create the virtual animal and share the virtual animal with the other users. According to at least one further embodiment, the one or more virtual objects may be derived contextually. For example, either the primary user or any secondary user may speak and/or make a gesture to derive the one or more virtual objects. Continuing the example, the primary user may gaze or at a building for a few seconds or point towards the building. In this example, a virtual object of the building may be derived by the virtual object display program 150.

The intersection boundary of the plurality of FOV cones may be defined by a size and a shape. The identified portion may be the largest area (i.e., the area where the 3D dimensions of the intersection boundary are at a maximum) within the intersection boundary where the 3D dimensions of the one or more virtual objects are able to be maximized. As described above with respect to step 204, the relative position of the primary user and the at least one secondary user may impact the angle of the FOV cone, and thus the shape and size of the intersection boundary. For example, where the intersection boundary forms the shape of a triangle, the identified portion may be towards the wider base of the triangle rather than the narrower top of the triangle. In another example, where the intersection boundary forms the shape of a diamond, the identified portion may be towards the wider center of the diamond rather than the narrower top and bottom of the diamond.

Next, at 210, the virtual object display program 150 predicts the maximized 3D dimensions of the one or more virtual objects. The maximized 3D dimensions of the one or more virtual objects are predicted at least based on the size of the identified portion. Thus, the 3D dimensions of the one or more virtual objects are directly proportional to the size of the identified portion. For example, where the virtual object is a building, and where the intersection boundary forms the shape of a triangle and the 3D size of the identified portion towards the wider base of the triangle is 2 feet in length, 2 feet in width, and 1 foot in height, the maximized 3D dimensions of the virtual building may be 2 feet in length, 2 feet in width, and 1 foot in height. In another example, where the virtual object is a building, and where the intersection boundary forms the shape of a diamond and the 3D size of the identified portion towards the wider center of the diamond is 1 foot in length, 1 foot in width, and 0.5 feet in height, the maximized 3D dimensions of the virtual building may be 1 foot in length, 1 foot in width, and 0.5 feet in height.

Then, at 212, the virtual object display program 150 displays the one or more virtual objects to the primary user and the at least one secondary user. The one or more virtual objects are displayed within the identified portion of the intersection boundary. Since the one or more virtual objects are displayed within the identified portion, the one or more virtual objects may be displayed consistent with the predicted maximized 3D dimensions. For example, where the virtual object is the building, and where the intersection boundary forms the shape of a triangle and the 3D size of the identified portion towards the wider base of the triangle is 2 feet in length, 2 feet in width, and 1 foot in height, the maximized 3D dimensions of the virtual building may be 2 feet in length, 2 feet in width, and 1 foot in height. In this example, the 3D dimensions of the virtual building displayed to the primary user and the at least one secondary user may be 2 feet in length, 2 feet in width, and 1 foot in height. In another example, where the virtual object is a building, and where the intersection boundary forms the shape of a diamond and the 3D size of the identified portion towards the wider center of the diamond is 1 foot in length, 1 foot in width, and 0.5 feet in height, the maximized 3D dimensions of the virtual building may be 1 foot in length, 1 foot in width, and 0.5 feet in height. In this example, the 3D dimensions of the virtual building displayed to the primary user and the at least one secondary user may be 1 foot in length, 1 foot in width, and 0.5 feet in height.

According to at least one embodiment, the one or more virtual objects may be displayed to the primary user and the at least one secondary user as a holographic projection by the holographic projector. For example, where the virtual objects are a virtual building and a virtual animal, the virtual building and the virtual animal may be displayed as the holographic projection. According to at least one other embodiment, the one or more virtual objects may be displayed to the primary user and the at least one secondary user as an AR image by the AR and/or VR device. Continuing the example described above, the virtual building and the virtual animal may be displayed as the AR image.

According to at least one further embodiment, the one or more virtual objects may be assigned a confidentiality level by the primary user. For example, the confidentiality levels of one or more virtual objects may be high, medium, and low. As described above with respect to step 206, the primary user may identify the secondary users who are participating in the collaboration. Similarly, the primary user may identify each secondary user who is authorized to view the one or more virtual objects. The primary user may assign clearance levels to each secondary user. For example, a secondary user having low clearance may only be able to view a virtual object having a low confidentiality level. The one or more virtual objects may only be displayed to each secondary user who is authorized by the primary user to view the one or more virtual objects. For example, where the secondary user is assigned a medium clearance, and where one virtual object is highly confidential and another virtual object has a low confidentiality level, the secondary user with the medium clearance may only be able to view the virtual object having the low confidentiality level.

Next, at 214, the virtual object display program 150 determines whether the orientation of at least one XR device changes. The determination may be made based on whether the 3D position of the at least one XR device changes. For example, when the initial orientation of the at least one XR device is in the northwest direction, and the primary user moves their head 90°, there may be the change in the orientation of the at least one XR device. Alternatively, in another example, one or more of the multiple users may move their head up or down, which may also change the orientation of the at least one XR device.

In response to determining the orientation of the at least one XR device changes (step 214, "Yes" branch), the virtual object display process 200 proceeds to step 216 to automatically adjust the maximized 3D dimensions of the one or more virtual objects. In response to determining the orientation of the at least one XR device does not change (step 214, "No" branch), the virtual object display process 200 ends.

Then, at 216, the virtual object display program 150 automatically adjusts the maximized 3D dimensions of the one or more virtual objects. When the orientation of the at least one XR device changes, the size and shape of the intersection boundary may also change. The maximized 3D dimensions of the one or more virtual objects may be adjusted to reflect an updated size of an updated portion within the intersection boundary. For example, where the virtual object is a building, and where the initial 3D size of the identified portion is 2 feet in length, 2 feet in width, and 1 foot in height, and where the updated size of the updated portion is 1.5 feet in length, 1.5 feet in width, and 0.5 feet in height, the maximized 3D dimensions of the virtual building may be automatically adjusted to 1.5 feet in length, 1.5 feet in width, and 0.5 feet in height.

In another example, where the virtual object is a building, and where the initial 3D size of the identified portion is 1 foot in length, 1 foot in width, and 0.5 feet in height, and where the updated size of the updated portion is 2 feet in length, 2 feet in width, and 1.5 feet in height, the maximized 3D dimensions of the virtual building may be automatically adjusted to 2 feet in length, 2 feet in width, and 1.5 feet in height. Thus, the maximized 3D dimensions of the one or more virtual objects may be automatically adjusted to be greater than or less than the original 3D dimensions.

According to at least one embodiment, the automatic adjustment of the maximized 3D dimensions of the one or more virtual objects may include replicating the one or more virtual objects. The one or more virtual objects may be replicated in response to determining the at least one additional intersection boundary is formed. Multiple intersection boundaries may be formed when the multiple users split into a variety of groups. Upon determining the at least one additional intersection boundary is formed, the virtual object display program 150 may replicate the one or more virtual objects consistent with the number of additional intersection boundaries. For example, when two additional intersection boundaries are formed, the one or more virtual objects may be replicated twice. The 3D dimensions of the one or more replicated virtual objects may then be adjusted by iterating steps 208 and 210 where the at least one additional intersection boundary is substituted for the intersection boundary. For example, where the replicated virtual object is a building, and where the intersection boundary forms the shape of a triangle and the 3D size of the identified portion towards the wider base of the triangle is 2 feet in length, 2 feet in width, and 1 foot in height, then when the 3D size of the updated identified portion of the at least one additional intersection boundary is 3 feet in length, 3 feet in width, and 2 feet in height, the 3D dimensions of the replicated virtual building may be 3 feet in length, 3 feet in width, and 2 feet in height.

Referring now to FIG. 3, a diagram 300 depicting an operational example of the virtual object 312 being displayed on the intersection boundary 310 of the FOV of multiple users (e.g., User A, User B, User C, and User D) is shown according to at least one embodiment. In the diagram 300, the multiple users (e.g., User A, User B, User C, and User D) may be positioned adjacent to one another in a semi-circular arrangement. Each of User A, User B, User C, and User D may be wearing the XR device having the 3D position. Based on the 3D position of each XR device, the plurality of FOV cones 302, 304, 306, and 308 corresponding to User A, User B, User C, and User D, respectively, may be derived. The plurality of FOV cones 302, 304, 306, and 308 may form the intersection boundary 310 at the location where the plurality of FOV cones 302, 304, 306, and 308 at least partially overlap, where the intersection boundary 310 is defined by a particular shape and size. Once the intersection boundary 310 has been identified, the portion within the intersection boundary 310 may also be identified where the 3D dimensions of the virtual object 312 are able to be maximized. For example, in this embodiment, the 3D dimensions of the virtual object 312 may be maximized toward the bottom-right corner of the intersection boundary 310. Thus, the virtual object 312 may be displayed to the multiple users (e.g., User A, User B, User C, and User D) within the identified portion of the intersection boundary 310.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of displaying a virtual object on an intersection of a field of view (FOV) of multiple users, the method comprising:
    receiving data relating to an orientation of a plurality of extended reality (XR) devices during a collaboration;
    deriving a plurality of FOV cones of a primary user and at least one secondary user based on the orientation of the plurality of XR devices and a relative position of the primary user and the at least one secondary user, wherein an angle of the plurality of FOV cones gradually expands as a distance from the plurality of XR devices increases;
    identifying an intersection boundary where the plurality of FOV cones at least partially overlap;
    identifying a portion within the intersection boundary where 3D dimensions of one or more virtual objects are able to be maximized based on the relative position of the primary user and the at least one secondary user, wherein the identified portion is an area where 3D dimensions of an identified shape defined by the intersection boundary are at a maximum;
    predicting the maximized 3D dimensions of the one or more virtual objects based on a size of the identified portion; and
    displaying, within the identified portion, the one or more virtual objects to the primary user and the at least one secondary user consistent with the maximized 3D dimensions of the one or more virtual objects.

2. The computer-based method of claim 1, further comprising:
    determining whether the orientation of at least one XR device changes; and
    in response to determining the orientation of the at least one XR device changes, automatically adjusting the maximized 3D dimensions of the one or more virtual objects.

3. The computer-based method of claim 2, wherein automatically adjusting the maximized 3D dimensions of the one or more virtual objects further comprises:
    replicating the one or more virtual objects in response to determining at least one additional intersection boundary is formed.

4. The computer-based method of claim 1, wherein at least one of the plurality of FOV cones is derived for a user who is participating in the collaboration virtually.

5. The computer-based method of claim 4, wherein the one or more virtual objects are displayed to the primary user and the at least one secondary user as a holographic projection.

6. The computer-based method of claim 1, wherein the one or more virtual objects are only displayed to each secondary user who is authorized by the primary user to view the one or more virtual objects.

7. The computer-based method of claim 1, wherein the XR device is selected from a group consisting of an augmented reality (AR) device, a virtual reality (VR) device, and a holographic projector.

8. A computer system, the computer system comprising:
    one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
    receiving data relating to an orientation of a plurality of extended reality (XR) devices during a collaboration;
    deriving a plurality of FOV cones of a primary user and at least one secondary user based on the orientation of the plurality of XR devices and a relative position of the primary user and the at least one secondary user, wherein an angle of the plurality of FOV cones gradually expands as a distance from the plurality of XR devices increases;

identifying an intersection boundary where the plurality of FOV cones at least partially overlap;

identifying a portion within the intersection boundary where 3D dimensions of one or more virtual objects are able to be maximized based on the relative position of the primary user and the at least one secondary user, wherein the identified portion is an area where 3D dimensions of an identified shape defined by the intersection boundary are at a maximum;

predicting the maximized 3D dimensions of the one or more virtual objects based on a size of the identified portion; and displaying, within the identified portion, the one or more virtual objects to the primary user and the at least one secondary user consistent with the maximized 3D dimensions of the one or more virtual objects.

9. The computer system of claim 8, further comprising:
determining whether the orientation of at least one XR device changes; and
in response to determining the orientation of the at least one XR device changes, automatically adjusting the maximized 3D dimensions of the one or more virtual objects.

10. The computer system of claim 9, wherein automatically adjusting the maximized 3D dimensions of the one or more virtual objects further comprises:
replicating the one or more virtual objects in response to determining at least one additional intersection boundary is formed.

11. The computer system of claim 8, wherein at least one of the plurality of FOV cones is derived for a user who is participating in the collaboration virtually.

12. The computer system of claim 11, wherein the one or more virtual objects are displayed to the primary user and the at least one secondary user as a holographic projection.

13. The computer system of claim 8, wherein the one or more virtual objects are only displayed to each secondary user who is authorized by the primary user to view the one or more virtual objects.

14. The computer system of claim 8, wherein the XR device is selected from a group consisting of an augmented reality (AR) device, a virtual reality (VR) device, and a holographic projector.

15. A computer program product, the computer program product comprising:
one or more computer-readable tangible storage medium and program instructions stored on at least one of the one or more computer-readable tangible storage medium, the program instructions executable by a processor capable of performing a method, the method comprising:

receiving data relating to an orientation of a plurality of extended reality (XR) devices during a collaboration;

deriving a plurality of FOV cones of a primary user and at least one secondary user based on the orientation of the plurality of XR devices and a relative position of the primary user and the at least one secondary user, wherein an angle of the plurality of FOV cones gradually expands as a distance from the plurality of XR devices increases;

identifying an intersection boundary where the plurality of FOV cones at least partially overlap;

identifying a portion within the intersection boundary where 3D dimensions of one or more virtual objects are able to be maximized based on the relative position of the primary user and the at least one secondary user, wherein the identified portion is an area where 3D dimensions of an identified shape defined by the intersection boundary are at a maximum;

predicting the maximized 3D dimensions of the one or more virtual objects based on a size of the identified portion; and displaying, within the identified portion, the one or more virtual objects to the primary user and the at least one secondary user consistent with the maximized 3D dimensions of the one or more virtual objects.

16. The computer program product of claim 15, further comprising:
determining whether the orientation of at least one XR device changes; and
in response to determining the orientation of the at least one XR device changes, automatically adjusting the maximized 3D dimensions of the one or more virtual objects.

17. The computer program product of claim 16, wherein automatically adjusting the maximized 3D dimensions of the one or more virtual objects further comprises:
replicating the one or more virtual objects in response to determining at least one additional intersection boundary is formed.

18. The computer program product of claim 15, wherein at least one of the plurality of FOV cones is derived for a user who is participating in the collaboration virtually.

19. The computer program product of claim 18, wherein the one or more virtual objects are displayed to the primary user and the at least one secondary user as a holographic projection.

20. The computer program product of claim 15, wherein the one or more virtual objects are only displayed to each secondary user who is authorized by the primary user to view the one or more virtual objects.

* * * * *